(12) United States Patent
Mahulikar

(10) Patent No.: US 6,447,563 B1
(45) Date of Patent: Sep. 10, 2002

(54) CHEMICAL MECHANICAL POLISHING SLURRY SYSTEM HAVING AN ACTIVATOR SOLUTION

(75) Inventor: Deepak Mahulikar, Madison, CT (US)

(73) Assignee: Arch Specialty Chemicals, Inc., Norwalk, CT (US)

( * ) Notice: Subject to any disclaimer, the term of this patent is extended or adjusted under 35 U.S.C. 154(b) by 0 days.

(21) Appl. No.: 09/425,358

(22) Filed: Oct. 22, 1999

Related U.S. Application Data

(60) Provisional application No. 60/105,366, filed on Oct. 23, 1998.

(51) Int. Cl.⁷ .............................. C09K 3/14; C09G 1/02; B24B 1/00
(52) U.S. Cl. ............................ 51/309; 51/307; 51/308; 106/3; 438/692; 438/693; 252/79.2; 252/79.3; 252/79.4
(58) Field of Search ......................... 51/307, 308, 309; 106/3; 438/692, 693; 510/167, 175, 397; 252/79.2, 79.3, 79.4, 79.5; 216/96, 89, 102, 103, 104, 105, 106, 107, 108, 109

(56) References Cited

U.S. PATENT DOCUMENTS

| | | | |
|---|---|---|---|
| 4,959,113 A | | 9/1990 | Roberts |
| 5,013,871 A | | 5/1991 | Mahulikar et al. |
| 5,084,071 A | | 1/1992 | Nenadic et al. |
| 5,209,816 A | | 5/1993 | Yu et al. |
| 5,230,833 A | | 7/1993 | Romberger et al. |
| 5,264,010 A | | 11/1993 | Brancaleoni et al. |
| 5,266,088 A | * | 11/1993 | Sandusky et al. ............. 51/309 |
| 5,318,927 A | | 6/1994 | Sandhu et al. |
| 5,340,370 A | | 8/1994 | Cadien et al. |
| 5,354,490 A | | 10/1994 | Yu et al. |
| 5,366,542 A | * | 11/1994 | Yamada et al. ............... 51/309 |
| 5,476,606 A | | 12/1995 | Brancaleoni et al. |
| 5,527,423 A | * | 6/1996 | Neville et al. ................. 51/308 |
| 5,700,383 A | * | 12/1997 | Feller et al. ................... 51/308 |
| 5,783,489 A | * | 7/1998 | Kaufman et al. ............. 51/309 |
| 5,800,577 A | * | 9/1998 | Kido ............................ 51/308 |
| 5,866,031 A | * | 2/1999 | Carpio et al. ............... 252/79.2 |
| 5,954,997 A | * | 9/1999 | Kaufman et al. .......... 252/79.2 |
| 5,993,686 A | * | 11/1999 | Streinz et al. ................ 51/309 |
| 6,063,306 A | * | 5/2000 | Kaufman et al. .......... 252/79.2 |
| 6,083,840 A | * | 7/2000 | Mravic et al. ............. 252/79.4 |
| 6,143,059 A | * | 11/2000 | Tangi et al. ................ 106/1.22 |

FOREIGN PATENT DOCUMENTS

| | | | |
|---|---|---|---|
| WO | WO 98/04646 | * | 2/1998 |

* cited by examiner

Primary Examiner—Michael Marcheschi
(74) Attorney, Agent, or Firm—Ohlandt, Greeley, Ruggiero & Perle, LLP

(57) ABSTRACT

This invention relates to a CMP slurry system for use in semiconductor manufacturing. The slurry system comprises two parts. The first part is a generic dispersion that only contains an abrasive and, optionally, a surfactant and a stabilizing agent. The generic dispersion can be used for polishing metals as well as interlayer dielectrics (ILD). The second part is a novel activator solution comprising at least two components selected from the group consisting of: an oxidizer, acids, amines, chelating agents, fluorine-containing compounds, corrosion inhibitors, buffering agents, surfactants, biological agents and mixtures thereof.

39 Claims, No Drawings

CHEMICAL MECHANICAL POLISHING SLURRY SYSTEM HAVING AN ACTIVATOR SOLUTION

This application claims priority from U.S. Provisional Application Ser. No. 60/105,366 filed on Oct. 23, 1998.

FIELD OF THE INVENTION

This invention relates to the field of semiconductor manufacturing. More particularly it relates to a chemical-mechanical polishing slurry system used in semiconductor manufacturing.

BACKGROUND OF THE INVENTION

Semiconductors are typically made up of millions of active devices that are connected together via metal interconnections to form circuits and components. The active devices are interconnected by a well-known multilayer interconnect process. In a typical interconnect process, alternating layers of metal and dielectric are put on the silicon wafer by a variety of processes. After each layer is applied, a means is used to remove excess amounts of these layers and to assure both local and global planarity of the surface in preparation for the application of the next layer.

A common process used to accomplish these goals is chemical mechanical planarization (CMP). In this process, an aqueous solution containing various chemicals and suspended abrasive particles, namely, a slurry, is interposed between the wafer and a moving pad while pressure is applied. The combination of the mechanical effects of the abrasive particles, applied pressure, imposed relative velocity and the chemical effects which result from chemical reaction between the material being polished and constituents in the solution result in a synergistic enhancement of the polishing rate or material removal rate. That is, the material removal rate is higher than that produced by either the mechanical effects or chemical effects alone.

There are two general types of layers that can be polished. The first layer is interlayer dielectrics (ILD), such as silicon oxide and silicon nitride. The second layer is metal layers such as tungsten, copper, aluminum, etc., which are used to connect the active devices.

In the case of CMP of metals, the chemical action is generally considered to take one of two forms. In the first mechanism, the chemicals in the solution react with the metal layer to continuously form an oxide layer on the surface of the metal. This generally requires the addition of an oxidizer to the solution such as hydrogen peroxide, ferric nitrate, etc. Then the mechanical abrasive action of the particles continuously and simultaneously removes this oxide layer. A judicious balance of these two processes obtains optimum results in terms of removal rate and polished surface quality.

In the second mechanism, no protective oxide layer is formed. Instead, the constituents in the solution chemically attack and dissolve the metal, while the mechanical action is largely one of mechanically enhancing the dissolution rate by such processes as continuously exposing more surface area to chemical attack, raising the local temperature (which increases the dissolution rate) by the friction between the particles and the metal and enhancing the diffusion of reactants and products to and away from the surface by mixing and by reducing the thickness of the boundary layer.

An ILD slurry typically is a one part system, which usually contains an alkaline fumed silica dispersion containing 12 to 25% fumed silica. Examples of commercial fumed silica dispersions are Cabot SS-25® and Wacker K 1020®. The ILD slurry is then shipped to the customer as a concentrate. The customer then dilutes the slurry by adding water at the point of use.

CMP metal slurries, on the other hand, are two part mixtures consisting of a dispersion and an oxidizer. The dispersion comprises an abrasive, an acid to lower the pH to about 2 to 6, optionally a surfactant which maintains the abrasive in suspension and other chemicals tailored to the metal being polished. An example is a tungsten layer slurry called Biplanar® made by EKC. The dispersion is an acidic dispersion (approximately pH of 3, with 5 to 15% alumina particles). Acids reportedly used in the slurry include carboxylic acids or nitric acid. At the point of use, the dispersion is mixed with an oxidizer, such as hydrogen peroxide or ferric nitrate, to form the slurry that will be used to polish the metal layers.

Metal slurry manufactures typically sell only the acidic dispersion while the customer buys the oxidizer independently and mixes the two parts at the point of use. In this case, the oxidizer is a standard bulk commodity solution that can be mixed with the different customized metal dispersion solutions. The problem with this system is that the customer has to inventory the various types of metal dispersion solutions. Since a semiconductor manufacturer typically uses many different metal layers and consumes many thousands of gallons of dispersions for each layer, controlling, storing and waste treating the inventory can be a formidable problem. For example, if the manufacturer does not forecast appropriately and the dispersion reaches its shelf life, then a large volume of dispersion may have to be disposed of which is very expensive and environmentally unfriendly.

In addition, the shelf life of the metal dispersions are reduced when the solid abrasive is mixed with the many different types of chemicals used in the dispersion. The abrasives tend to react with the chemicals in the dispersion resulting in reduced shelf life. Also, the finer particles tend to agglomerate in the presence of these chemicals. Agglomerates tend to settle in the container resulting in a non-uniform product, which can ultimately lead to serious problems or defects on the surface of the substrate.

Therefore, the present invention modifies the current metal slurry system so that the current problem of inventory control is simplified by standardizing the dispersion and customizing the activator for the particular metal layer being polished.

One advantage of the present invention is that the inventory control of the slurry is greatly simplified since the volume of chemicals that have to be controlled is greatly reduced. The volume of the activator will typically be 5 to 10 times less than the volume of the dispersion. Therefore, instead of controlling a large volume of different dispersions, the manufacturer will only have to control a small volume of different activators. This significantly reduces the amount of inventory space required because the manufacture does not have to stock a large volume of different dispersions. Also, the inventory can be more effectively managed because the manufacturer can quickly and accurately measure the use of the generic dispersion solution and forecast appropriately.

Another advantage of the present invention is that since the aggressive chemicals are removed from the abrasives, the shelf life of the dispersion will be increased. Thus, it is less likely that large volumes of dispersion material will have to be disposed due to the increased shelf life and better forecasting. Conversely, since the activator solution does not have any abrasive, it has a reduced shelf life problems and, therefore, many smaller quantities of the activator solution may be stored whenever necessary.

Still another advantage of the present invention is that by using a standard dispersion, (withoutaggressive chemicals), one can take advantage of all the reliability storage life data already generated on these products. For example, if customers standardize their dispersion using a familiar commercialized product such as Cabot SS-25®, the storage life data is well known and does not have to be generated.

Furthermore, the present invention offers a major advantage for slurry manufacturers because it reduces their inventory. Instead of manufacturing a large variety of metal layer dispersions, the manufacturer only needs to prepare one or two standard dispersions. The chemical supplier, who is the expert in the area, will manufacture the activator solution so that it will be optimized for the metal layers.

The present invention also provides many additional advantages which shall become apparent as described below.

SUMMARY OF THE INVENTION

The present invention relates to a novel CMP slurry system used for polishing metals comprising: (a) a dispersion solution comprising an abrasive; and (b) an activator solution comprising at least two components selected from the group consisting of: an oxidizer, acids, amines, chelating agents, fluorine-containing compounds, corrosion inhibitors, buffering agents and biological agents, which are customized for the specific metal layer being polished.

DETAILED DESCRIPTION OF THE INVENTION

This invention relates to a novel CMP slurry system for use in semiconductor manufacturing. The slurry system comprises two parts. The first part is a generic dispersion that only contains an abrasive and optionally a stabilizing agent, such as KOH or $NH_4OH$, and a surfactant that keeps the abrasive in suspension. The generic dispersion can be used for polishing metals as well and interlayer dielectrics (ILD). The second part is a novel activator solution. The activator solution comprises chemicals such as oxidizers and acids that are customized for the metal layers.

The generic dispersion will typically only contain an abrasive and optionally a surfactant and a stabilizer. Typically, the abrasive particles will be fumed silica which is the most common abrasive used in the semiconductor manufacturing. However, if the manufacturer desires to standardize on a different abrasive, that may be done as well. In addition to silica ($SiO_2$), other abrasives which may be used are: alumina ($Al_2O_3$), silicon carbide, silicon nitride, iron oxide, ceria ($CeO_2$), zirconium oxide, tin oxide, titanium dioxide and mixtures thereof. The preferred abrasive is fumed silica or a solution grown form of silica (colloidal silica). An example of the generic dispersion is Cabot SS-25® with 25% fumed silica and a small amount of KOH to stabilize the dispersion. It has been in use for over three years and is very well known in the CMP art.

The surfactant compounds which may be used in the dispersion are present in an amount of about 0.001 to 2 percent and preferably in the range of about 0.01 to 0.2 percent based on the total weight of thedispersion. Suitable surfactant compounds include any of the numerous non-ionic, anionic, cationic or amphoteric surfactants known to those skilled in the art.

Optionally, a wetting agent may be used. The wetting agent may be, for example, an acid such as hydrochloric acid, as taught in U.S. Pat. No. 5,246,624 to Miller et al.

The optional stabilizing agent in the generic dispersion is preferably KOH or $NH_4OH$, which is added in sufficient amounts to adjust the pH of the dispersion to the desired value of from about 10 to 11.5.

The novel activator comprises chemicals that are customized to the particular metal being polished. For example, the activator of the present invention may include an oxidizer. Any suitable oxidizer may be used. Examples of a suitable oxidizer are hydrogen peroxide, potassium ferricyanide, potassium dichromate, potassium iodate, potassium bromate, vanadium trioxide, hypochlorous acid, sodium hypochlorite, potassium hypochlorite, calcium hypochlorite, magnesium hypochlorite, ferric nitrate, $KMgO_4$, and mixtures thereof. The preferred oxidizer is hydrogen peroxide. The amount of oxidizer is typically 0.01% to 10%, and preferably 0.1 to 5% by weight of the total weight of the slurry.

Other chemicals are also added to the activator depending on the type of metal. being polished. For example, the activator will typically contain an acid. The acid is added in an amount so that the pH of the slurry is maintained at about 2 to 11, preferably about 2 to 10, and more preferably about 2 to 5. Any suitable acid may be used in the activator including organic acids such as formic acid, acetic acid, propanoic acid, butanoic acid, pentanoic acid, hexanoic acid, heptanoic acid, octanoic acid, nonanoic acid, lactic and mixtures thereof. Also inorganic acids may be used such as hydrochloric acid, nitric acid, phosphoric acid, sulfuric acid, hydrofluoric acid, and mixtures thereof. Preferred acids are those that contain one or more carboxylic acid groups substituted with hydroxyl groups such as malic acids, tartaric acids, gluconic acids, and citric acids. Also preferred are polyhydroxybenzoic acids such as phthalic acids, pyrocatechoic acid, pyrogallol carboxylic acid, gallic acid and tannic acid. In addition, suitable alkali or alkaline earth metal salts of the acids can be added as buffering agents to buffer the solution. Buffering agents maintain the solution at constant pH.

Amines are also useful in the composition of the present invention. For example, the amine may be, hydroxylamine and other alkanolamines such as monoethanolamine, diethanolamine, triethanolamine, diethyleneglycolamine, N-hydroxylethylpiperazine, and the like.

In addition, a fluorine-containing compound may be useful when polishing tantalum or titanium layers. Examples of fluorine containing compounds are hydrogen fluoride, perfluoric acid, alkali metal fluoride salt, alkaline earth metal fluoride salt, ammonium fluoride, tetramethylammonium fluoride, ammonium bifluoride, ethylenediammonium difluoride, diethylenetriammonium trifluoride and mixtures thereof. The preferred fluoride is ammonium fluoride.

Another useful component is a corrosion inhibitor. Corrosion inhibitors, such as benzotriazole (BTA), 6-tolylytriazole, 1-(2,3, dicarboxypropyl-)benzotriazole, carboxylic acids, mixtures thereof, and the like, may be used.

Furthermore, chelating agents may be added to the activator such as ethylenediaminetetracetic acid (EDTA), N-hydroxyethylethylenediaminetriacetic acid (NHEDTA), nitrilotriacetic acid (NTA), diethylklenetriaminepentacetic acid (DPTA), ethanoldiglycinate, mixtures thereof, and the like.

Still other chemicals that can be added to the activator solution are biological agents such as bactericide, biocides and fungicides especially if the pH is around about 6 to 9. Preferred bactericide is at least one compound selected from the group consisting of tetramethyl ammonium chloride, tetraethyl ammonium chloride, tetrapropyl ammonium chloride, tetramethyl ammonium hydroxide, tetraethyl ammonium chloride, tetrapropyl ammonium hydroxide, alkylbenzyldimethylammonium hydroxide, and alkylbenzyldimethylammonium chloride, wherein the alkyl chain ranges from about 1 to 20 carbons. The preferred biocide is sodium chlorite or sodium hypochlorite. The preferred fungicide is sodium pyrithione. The biological agent is present in an amount of about 0.001 to 5% weight percent based on the total weight of the activator.

Surfactant may also be added to the activator solution. Suitable surfactant compounds include any of the numerous non-ionic, anionic, cationic or amphoteric surfactants known to those skilled in the art.

In a preferred embodiment, the activator solution comprises: (a) about 0.05 wt. % to 5 wt. % of hydrogen peroxide; (b) about 0.05 wt. % to 3 wt. % of propanoic acid; (c) about 0.02 wt. % to 1.5 wt. % of benzotriazole; and (d) about 0.01 wt. % to 2 wt. % of ethanolamine.

The present invention also includes a process for polishing metal layers, using the slurry system disclosed. The process comprising the steps of: (a) providing a substrate with at least one metal layer; (b) providing a slurry system comprising (i) a dispersion solution comprising an abrasive and optionally a surfactant and a stabilizing agent; and (ii) an activator solution comprising at least two components selected from the group consisting of: an oxidizer, acids, amines, chelating agents, fluorine-containing compounds, corrosion inhibitors, buffering agents, surfactants, biological agents and mixtures thereof; and (c) chemically mechanically polishing the substrate with the slurry system.

As discussed above, the activator solution will be customized to the metal being polished. Table 1 below shows the preferred activator solution for specified metal layers.

TABLE 1

| Metal Type | Abrasive Dispersion (STD) | Activator |
|---|---|---|
| Tungsten | $SiO_2$ or $Al_2O_3$ | $H_2O_2$ or ferric nitrate + Lactic acid or Nitric Acid + Buffering Agent |
| Copper/ Tantalum | $SiO_2$ or $Al_2O_3$ | $H_2O_2$ + Propanoic acid or phthalic acid or citric acid + BTA |
| Tantalum | $SiO_2$ or $Al_2O_3$ | $H_2O_2$ + $NH_4F$ |
| Aluminum | $SiO_2$ or $Al_2O_3$ | $H_2O_2$ + $NH_4F$ + weak acid |
| Titanium | $SiO_2$ or $Al_2O_3$ | $H_2O_2$ + $NH_4F$ + weak acid |

This invention is explained below in further detail with references to examples, which are not by way of limitation, but by way of illustration.

EXAMPLE 1

Preparation of Copper CMP Slurry System

A copper slurry was prepared by utilizing a silica dispersion containing 12% fumed silica. The silica dispersion was mixed with an activator containing hydrogen peroxide and propanoic acid. The final copper slurry mixture contained 1% $H_2O_2$ by weight, 4% fumed silica by weight and 0.1 molar propanoic acid. Copper wafers were obtained by sputter deposition on a silicon wafer and were polished using the copper slurry with a Rodel IC1400 pad and IPEC 472 tool. The removal rates were in excess of 450 nm, the non-uniformity was less than 5% and the selectivity of copper to $SiO2$ was over 200. The passive etch rate without mechanical polishing was 10 nm/minute. In comparison, a commercial copper slurry (Rodel QC 1020) had similar performance.

EXAMPLE 2

Preparation of Tantalum CMP Slurry System

A Ta slurry was prepared using a standard silica dispersion and an activator containing 0.2% $H2O2$ and a 2.5 ml/l solution of propanoic acid. The polishing was performed on an IPEC472 polisher using standard 8 inch wafers that contained copper/tantalum/silicon dioxide layers. The removal rates using the Ta slurry was 125 nm/min for copper, 100 nm/min for tantalum and 130 nm/min for $SiO2$. The passive etch rate is less than 5 nm/min.

EXAMPLE 3

Table 2 shows how the shelf-life of metal dispersions are reduced when the solid abrasive is mixed with chemicals used in the dispersion and stored over time.

TABLE 2

| Time (hrs) | Cu10K, 55 C | Cu15K, 55 C | Cu10K, RT | Cu10K, RT |
|---|---|---|---|---|
| 0 | 3245 | 4034 | 3245 | 4034 |
| 24 |  | 3381 | 3363 | 2893 |
| 48 | 4831 | 5354 | 2568 | 3682 |
| 96 | 8973 | 13115 | 3275 | 3439 |
| 168 | 9975 | 12387 | 3683 | 4253 |

Cu10K and Cu15K are slurry compositions containing the solid abrasive mixed with chemicals.

In Table 2, large particle counts (LPC) greater than 0.56 microns are shown. The data indicates that the large particle counts increase during storage of the metal dispersion, that is, there is a higher number of particles having a particle size, greater than 0.56 microns over time: Particle sizes greater than 0.56 microns contribute substantially to defects on the surface of a substrate, i.e. copper.

The present invention has been described with particular reference to the preferred forms thereof. It will be obvious to one of ordinary skill in the art that changes and modifications may be made therein without departing from the spirit and scope of the present invention as defined by the following claims.

What is claimed is:

1. A novel slurry system used for polishing metal layers comprising a first part and a second part:
   (a) said first part comprising a dispersion solution consisting essentially of an abrasive, a stabilizing agent and a surfactant; and
   (b) said second part comprising an activator solution, free of abrasives, having at least two components selected from the group consisting of: an oxidizer, acids, amines, chelating agents, fluorine-containing compounds, corrosion inhibitors, biological agents, surfactants, buffering agents, and mixtures thereof;
   wherein said first and second parts of said slurry system are packaged separately.

2. The system of claim 1 wherein said abrasive is selected from the group consisting of: silica, alumina, silicon carbide, silicon nitride, iron oxide, ceria, zirconium oxide, tin oxide, titanium dioxide and mixtures thereof.

3. The system of claim 1 wherein said abrasive is a fumed silica or a colloidal silica.

4. The system of claim 1 wherein said surfactant in said dispersion solution, said activator solution, or both is selected from the group consisting of: non-ionic, anionic, cationic and amphoteric surfactants.

5. The system of claim 1 wherein said acid is selected from the group consisting of: formic acid, acetic acid, propanoic acid, butanoic acid, pentanoic acid, hexanoic acid, heptanoic acid, octanoic acid, nonanoic acid, lactic acid, hydrochloric acid, nitric acid, phosphoric acid, sulfuric acid, hydrofluoric acid, malic acid, tartaric acid, gluconic acid, citric acid, phthalic acid, pyrocatechoic acid, pyrogallol carboxylic acid, gallic acid, tannic acid and mixtures thereof.

6. The system of claim 1 wherein said amine is selected from the group consisting of: hydroxylamine, monoethanolamine, diethanolamine, triethanolamine, diethyleneglycolamine, N-hydroxylethylpiperazine, and mixtures thereof.

7. The system of claim 1 wherein said fluorine-containing compound is selected from the group consisting of: hydrogen fluoride, perfluoric acid, alkali metal fluoride salt, alkaline earth metal fluoride salt, ammonium fluoride, tetramethylammonium fluoride, ammonium bifluoride, ethylenediammonium difluoride, diethylenetriammonium trifluoride and mixtures thereof.

8. The system of claim 1 wherein said corrosion inhibitor is selected from the group consisting of: benzotriazole, 6-tolylytriazole, 1-(2,3, dicarboxypropyl)benzotriazole, carboxylic acids and mixtures thereof.

9. The system of claim 1 wherein said chelating agent is selected from the group consisting of: ethylenediaminetetracetic acid, N-hydroxyethylethylenediaminetriacetic acid, nitrilotriacetic acid, diethylklenetriaminepentacetic acid, ethanoldiglycinate, and mixtures thereof.

10. The system of claim 1 wherein a mixture of said dispersion solution and said activator solution has a pH between about 2 to about 11.

11. The system of claim 10 wherein said pH of said mixture is between about 2 to about 10.

12. The system of claim 1 wherein said stabilizing agent is selected from the group consisting of KOH and $NH_4OH$.

13. The system of claim 1 wherein said biological agents are selected from the group consisting of: sodium pyrithione, sodium chlorite, sodium hypochlorite, tetramethyl ammonium chloride, tetraethyl ammonium chloride, tetrapropyl ammonium chloride, tetramethyl ammonium hydroxide, tetraethyl ammonium chloride, tetrapropyl ammonium hydroxide, alkylbenzyldimethylammonium hydroxide, and alkylbenzyldimethylammonium chloride, wherein the alkyl chain ranges from about 1 to 20 carbons.

14. An activator solution, free of abrasives, for a slurry system used for polishing metal layers, said slurry system having a first part and a second part, said activator solution comprising: at least three components selected from the group consisting of: an oxidizer, acids, amines, chelating agents, fluorine-containing compounds, corrosion inhibitors, buffering agents, surfactants, biological agents, and mixtures thereof;
wherein said first part is a dispersion solution and said activator solution is said second part of said slurry system, and said activator solution is packaged separately from said dispersion solution.

15. The activator of claim 14 wherein said acid is selected from the group consisting of: formic acid, acetic acid, propanoic acid, butanoic acid, pentanoic acid, hexanoic acid, heptanoic acid, octanoic acid, nonanoic acid, lactic acid, hydrochloric acid, nitric acid, phosphoric acid, sulfuric acid, hydrofluoric acid, malic acid, tartaric acid, gluconic acid, citric acid, phthalic acid, pyrocatechoic acid, pyrogallol carboxylic acid, gallic acid, tannic acid and mixtures thereof.

16. The activator of claim 14 wherein said amine is selected from the group consisting of: hydroxylamine, monoethanolamine, diethanolamine, triethanolamine, diethyleneglycolamine, N-hydroxylethylpiperazine, and mixtures thereof.

17. The activator of claim 14 wherein said fluorine-containing compound is selected from the group consisting of: hydrogen fluoride, perfluoric acid, alkali metal fluoride salt, alkaline earth metal fluoride salt, ammonium fluoride, tetramethylammonium fluoride, ammonium bifluoride, ethylenediammonium difluoride, diethylenetriammonium trifluoride and mixtures thereof.

18. The activator of claim 14 wherein said corrosion inhibitor is selected from the group consisting of: benzotriazole, 6-tolylytriazole, 1-(2,3, dicarboxypropyl) benzotriazole, carboxylic acids and mixtures thereof.

19. The activator of claim 14 wherein said chelating agent is selected from the group consisting of: ethylenediaminetetracetic acid, N-hydroxyethylethylenediaminetriacetic acid, nitrilotriacetic acid, diethylklenetriaminepentacetic acid, ethanoldiglycinate, and mixtures thereof.

20. The activator of claim 14 wherein said metal layer is tungsten, said oxidizer is selected from the group consisting of: hydrogen peroxide and ferric nitrate, and said acid is selected from the group consisting of: lactic acid and nitric acid.

21. The activator of claim 14 wherein said biological agents are selected from the group consisting of: sodium pyrithione, sodium chlorite, sodium hypochlorite, tetramethyl ammonium chloride, tetraethyl ammonium chloride, tetrapropyl ammonium chloride, tetramethyl ammonium hydroxide, tetraethyl ammonium chloride, tetrapropyl ammonium hydroxide, alkylbenzyldimethylammonium hydroxide, and alkylbenzyldimethylammonium chloride, wherein the alkyl chain ranges from about 1 to 20 carbons.

22. The activator of claim 14 wherein said metal layer is copper and wherein said activator comprises hydrogen peroxide; an acid selected from the group consisting of propanoic acid, phthalic acid and citric acid; and benzotriazole.

23. The activator of claim 14 wherein said metal layer is tantalum and wherein said activator comprises hydrogen peroxide, ammonium fluoride and at least one other component.

24. The activator of claim 14 wherein said metal layer is aluminum and wherein said activator comprises hydrogen peroxide, ammonium fluoride and a weak acid.

25. The activator of claim 14 wherein said metal layer is titanium and wherein said activator comprises hydrogen peroxide, ammonium fluoride and a weak acid.

26. An activator solution, free of abrasives, for a slurry system used for polishing metal layers, said slurry system having a first part and a second part, said activator solution comprising:
(a) about 0.05 wt. % to 5 wt. % of hydrogen peroxide;
(b) about 0.05 wt. % to 3 wt. % of propanoic acid;
(c) about 0.02 wt. % to 1.5 wt. % of benzotriazole; and
(d) about 0.01 wt. % to 2 wt. % of ethanolamine;
wherein said first part is a dispersion solution and said activator solution is said second part of said slurry system, and said activator solution is packaged separately from said dispersion solution.

27. A process for polishing a metal layer comprising the steps of:

(a) providing a substrate with at least one metal layer;

(b) contacting said substrate with a slurry system, said slurry system comprising: (i) a first part comprising a dispersion solution consisting essentially of an abrasive, a stabilizing agent and a surfactant; and (ii) a second part comprising an activator solution, free of abrasives, having at least two components selected from the group consisting of: an oxidizer, acids, amines, chelating agents, fluorine-containing compounds, corrosion inhibitors, buffering agents, surfactants, biological agents, and mixtures thereof, wherein said first part and said second part are packaged separately;

(c) releasing said first part and said second part from said separate packages;

(d) mixing said first part and said second part; and (e) chemically mechanically polishing said substrate with said mixture of step (d).

28. The process of claim 27 wherein said abrasive is selected from the group consisting of: silica, alumina, silicon carbide, silicon nitride, iron oxide, ceria, zirconium oxide, tin oxide, titanium dioxide and mixtures thereof.

29. The process of claim 27 therein said abrasive is a fumed silica or a colloidal silica.

30. The process of claim 27 wherein said surfactant in said dispersion solution, said activator solution, or both is selected from the group consisting of: non-ionic, anionic, cationic and amphoteric surfactants.

31. The process of claim 27 wherein said acid is selected from the group consisting of: formic acid, acetic acid, propanoic acid, butanoic acid, pentanoic acid, hexanoic acid, heptanoic acid, octanoic acid, nonanoic acid, lactic acid, hydrochloric acid, nitric acid, phosphoric acid, sulfuric acid, hydrofluoric acid, malic acid, tartaric acid, gluconic acid, citric acid, phthalic acid, pyrocatechoic acid, pyrogallol carboxylic acid, gallic acid, tannic acid and mixtures thereof.

32. The process of claim 27 wherein said amine is selected from the group consisting of: hydroxylamine, monoethanolamine, diethanolamine, triethanolamine, diethyleneglycolamine, N-hydroxylethylpiperazine, and mixtures thereof.

33. The process of claim 27 wherein said fluorine-containing compound is selected from the group consisting of: hydrogen fluoride, perfluoric acid, alkali metal fluoride salt, alkaline earth metal fluoride salt, ammonium fluoride, tetramethylammonium fluoride, ammonium bifluoride, ethylenediammonium difluoride, diethylenetriammonium trifluoride and mixtures thereof.

34. The process of claim 27 wherein said corrosion inhibitor is selected from the group consisting of: benzotriazole, 6-tolylytriazole, 1-(2,3, dicarboxypropyl) benzotriazole, carboxylic acids and mixtures thereof.

35. The process of claim 27 wherein said chelating agent is selected from the group consisting of: ethylenediaminetetracetic acid, N-hydroxyethylethylenediaminetriacetic acid, nitrilotriacetic acid, diethylklenetriaminepentacetic acid, ethanoldiglycinate, and mixtures thereof.

36. The process of claim 27 wherein said mixture has a pH between about 2 to about 11.

37. The process of claim 36 wherein said mixture has a pH between about 2 to about 10.

38. The process of claim 27 wherein said stabilizing agent is selected from the group consisting of $KOH$ and $NH_4OH$.

39. The process of claim 27 wherein said biological agent is selected from the group consisting of: sodium pyrithione, sodium chlorite, sodium hypochlorite, tetramethyl ammonium chloride, tetraethyl ammonium chloride, tetrapropyl ammonium chloride, tetramethyl ammonium hydroxide, tetraethyl ammonium chloride, tetrapropyl ammonium hydroxide, alkylbenzyldimethylammonium hydroxide, and alkylbenzyldimethylammonium chloride, wherein the alkyl chain ranges from about 1 to 20 carbons.

* * * * *